Patented July 7, 1953

2,644,825

UNITED STATES PATENT OFFICE 2,644,825

METHOD OF SULFURIZING FATS AND FATTY ACIDS

Helen Sellei Beretvas, Chicago, Ill., assignor to Standard Oil Company, Chicago, Ill., a corporation of Indiana No Drawing. Application August 5, 1949, Serial No. 108,856

18 Claims. (Cl. 260—399)

This invention relates to the sulfurization of unsaturated fats, fatty acids and mixtures thereof, and more particularly relates to the sulfurization of unsaturated fats and/or fatty acids with a sulfur chloride in the presence of a small amount of water.

An object of the present invention is to provide an improved method of sulfurizing unsaturated fats and/or fatty acids to obtain sulfurized products of good color and a high stable sulfur content.

Another object of the invention is to provide an efficient method of sulfurizing organic compounds containing unsaturated fats and/or fatty acid to obtain light colored sulfurized products.

Other objects and advantages of the invention will become apparent from the following description thereof.

In accordance with the present invention unsaturated fats, unsaturated fatty acids and mixtures thereof are sulfurized with a sulfur chloride in the presence of a small amount of water in the manner herein described. The unsaturated fats and fatty acids are preferably those having at least 8 carbon atoms, preferably from about 10 to 20 carbon atoms, and containing at least one double bond. Examples of such unsaturated fats are mono-, di-, and tri-olein, mono-, di-, and tristearolein, ricinolein, as well as mixtures of the unsaturated fats or glycerides; the types of the unsaturated fatty acids which can be sulfurized in accordance with the present invention is illustrated by the following specific fatty acids: oleic acid, elaidic acid, erucic acid, linoleic acid, linolenic acid, and hydroxylated unsaturated acids, such as ricinoleic acid. Materials or compounds containing mixtures of unsaturated fats and/or fatty acids can also be used, i. e. animal, vegetable and marine fats and oils, such as for example, linseed oil, fish oil, fish oil residue, cottonseed oil, soya bean oil, rape oil, lard oil, etc. I can also use compositions composed of at least 50% unsaturated fats, fatty acids or mixtures thereof, for example, tall oil which contains about 50-55% unsaturated aliphatic acids, such as oleic, linoleic and linolenic acids, and about 40% abietic acid.

The sulfurization in accordance with the present invention is accomplished by reacting the aforementioned unsaturated fats, fatty acids or mixtures thereof, with 5 to 50 volume percent, and preferably 10 to 30 volume percent of a sulfur chloride in the presence of 1 to about 50 volume percent, and preferably 5 to about 20 volume percent of added water at a temperature of from about 40° F. to about 250° F., and preferably from about 120° F. to about 160° F. for a period of time from about one-quarter hour to about two hours, and preferably from about one-half hour to about one hour. In carrying out the sulfurization, I prefer to add the sulfur chloride and water simultaneously but separately to the compounds to be sulfurized; however, the sulfurization can be carried out by adding the sulfur chloride to a mixture of the herein described unsaturated compounds and water, or such compounds may be added to the mixture of sulfur chloride and water. In the former case, the sulfur chloride should be added slowly, while in the latter case, precaution should be taken to provide adequate cooling since the reaction is vigorous. The sulfurization can also be carried out by adding water to a mixture of sulfur chloride and the unsaturated compound; however, in this case the sulfurized product is usually darker than that obtained in the other variations. In the preferred order of adding the reactants the sulfur chloride addition can be completed in about 10 minutes. The sulfur chloride mentioned may be any of the usual sulfur chlorides, such as sulfur monochloride ($S_2Cl_2$), sulfur dichloride ($SCl_2$), or mixtures thereof.

The sulfurized product obtained in the manner described contains some so-called corrosive sulfur and chlorine, and for uses wherein the presence of corrosive sulfur and chlorine is not detrimental or objectionable the product obtained in the sulfurization reaction can be used as such, after neutralization with an alkaline reagent such as an alkali metal or alkaline earth oxide, hydroxide, or carbonate, for example NaOH, $Na_2CO_3$, CaO, $K_2CO_3$, etc. The alkaline reagent is preferably added in solid form, although solutions thereof can be used. The neutralized product can then be taken up in a low boiling hydrocarbon solvent, preferably aliphatic hydrocarbon, such as hexane, naphtha, etc., separated from the hydrocarbon insoluble products and recovered by evaporation or distillation of the solvent.

If the presence of corrosive sulfur is objectionable or detrimental to the intended use of the sulfurized product the latter can be freed of the corrosive sulfur by subjecting the same to a so-called deactivation step. To obtain a non-corrosive product the sulfurized product, either after neutralization as above described or without prior neutralization, is refluxed with a solution containing about 5 percent to about 50 percent of an alkali metal sulfide, such as sodium sulfide, a low molecular weight aliphatic alcohol, such as isopropyl alcohol, ethyl alcohol, butyl alcohol, and the like, and water. The solutions are refluxed for a period of from about one hour to about five hours, and preferably for about three hours. A suitable deactivating solution is one containing about 18 grams of anhydrous sodium sulfide, 34 cubic centimeters of isopropyl alcohol, and 100 cubic centimeters of water for each 100 grams of the sulfurized product. Deactivation of a previously neutralized sulfurized product can be accomplished by refluxing the entire neutralized reaction mass with the alcoholic solution of the alkali metal sulfide without separating the neutralized hydrocarbon soluble fractions from the insoluble fractions. After refluxing for the desired period, an equal volume of a low boiling hydrocarbon solvent, such as hexane or a low boiling naphtha such as a petroleum naphtha boiling below about 360° F., is added, if necessary, to the refluxed solution and the mixture allowed to settle for several hours to permit stratification into two distinct layers, the upper containing the deactivated sulfurized product. The deactivated product is recovered by distilling off the hydrocarbon diluent or by other suitable means. The deactivation step also removes chlorine from the sulfurized product, the extent of dechlorination being dependent upon the amount of deactivator, i. e. Na2S, a sulfurized product substantially free of chlorine can be obtained.

To control the rate of reaction it is often desirable to dilute the unsaturated compound with a diluent such as a substantially saturated hydrocarbon solvent, for example, a petroleum naphtha, hexane or other relatively low boiling hydrocarbon solvent, i. e. boiling below about 360-370° F. Where it is not essential that the diluent or solvent be removed from the sulfurized product, higher boiling materials, such as a viscous hydrocarbon oil, can be used as the diluent.

The herein described method of sulfurizing unsaturated fats and fatty acids will be readily understood from the following examples, which are given by way of illustration and are not intended as limiting the scope of the invention.

*Example I*

A lard oil, substantially freed of unsaturated fatty acids and having an iodine number of 66 was diluted with naphtha in the ratio of 1:1, and the diluted mixture reacted with 16 volume percent sulfur chloride and 10 volume percent water at a temperature of 79° F. to 118° F. for 60 minutes; the water and sulfur chloride being added simultaneously but separately to the diluted lard oil. At the end of the sulfurization period the reaction product was diluted with hexane and neutralized with 15 weight percent solid sodium carbonate and subsequently deactivated by treatment with 18 weight percent of sodium sulfide. After removal of the diluents from the diluent-soluble portion the recovered sulfurized product had a sulfur content of 7.8%, a chlorine content of 2.86% and an A. S. T. M. color of 4.

*Example II*

A lard oil of the type used in Example I was sulfurized in the manner described in Example I with the exception that no water was present during the sulfurization. The recovered sulfurized product had a sulfur content of 4.86%, a chlorine content of 0.99%, and an A. S. T. M. color of 3. The sulfur and chlorine content of this product was very much lower than the sulfur and chlorine content of the product of Example I.

*Example III*

A cod liver oil residue having a free fatty acid content of only 0.06% and an iodine number of 152 was diluted with naphtha in the ratio of 2:1 and the diluted mixture sulfurized by reacting the same with 13 volume percent sulfur chloride in the presence of 10 volume percent of water at a temperature of 77° F. to 149° F. for a period of about 60 minutes. At the end of the sulfurization period the product was taken up in hexane and neutralized with 15 weight percent of solid sodium carbonate. The diluent-soluble portion was then separated from the diluent-insoluble material and the diluent removed from the former by evaporation. The sulfurized product recovered had a sulfur content of 7.2%, a chlorine content of 4.3% and a true color of 368.

*Example IV*

Oleic acid was sulfurized by treatment with 16 volume percent sulfur chloride in the presence of 10% water at a temperature of 122° F. to 158° F. for a period of 60 minutes. At the end of the sulfurization period the product was diluted with hexane and the sulfurized product neutralized with 15 weight percent sodium carbonate. After neutralization the hexane-soluble material was separated from the hexane-insoluble material, and the former heated to remove the hexane by evaporation. The recovered sulfurized product had a sulfur content of 10.6%, a chlorine content of 6.4% and a true color of 150.

*Example V*

Oleic acid was sulfurized in the manner described in Example IV with the exception that no water was present during the sulfurization. The recovered product had a sulfur content of 11.2%, a chlorine content of 6.3% and a true color of 528.

*Example VI*

Linolenic acid was sulfurized by reacting the same with 16 volume percent sulfur chloride in the presence of 10 volume percent water at a temperature of 95° F. to 172° F. for a period of 60 minutes. At the end of the sulfurization period the product was diluted with hexane and the diluted product neutralized with 15 weight percent solid sodium carbonate. After neutralization the hexane-soluble portion was recovered and freed of the diluent. The recovered product had a sulfur content of 10.1%, a chlorine content of 7.6%, and a true color of 75.

*Example VII*

Linolenic acid was sulfurized in the manner described in Example VI with the exception that no water was present during the sulfurization. The recovered sulfurized product had a sulfur content of 8.6%, a chlorine content of 8.24% and a true color of 240.

The true color value reported herein is obtained by determining the dilution necessary to get an A. S. T. M. color between 4 to 5 by using a colorless diluent, e. g. naphtha, and calculating the true color according to the following table:

TRUE COLORS FROM ASTM COLORS

| Dilution* Ratio | ASTM Color | | | | |
|---|---|---|---|---|---|
| | 5 | 4¾ | 4½ | 4¼ | 4 |
| 1:1** | 75 | 60 | 46 | 33 | 29 |
| 1:2 | 150 | 120 | 92 | 66 | 58 |
| 1:4 | 300 | 240 | 184 | 132 | 116 |
| 1:8 | 600 | 480 | 368 | 264 | 232 |
| 1:16 | 1,200 | 960 | 736 | 528 | 464 |
| 1:32 | 2,400 | 1,920 | 1,472 | 1,056 | 928 |
| 1:64 | 4,800 | 3,840 | 2,944 | 2,112 | 1,856 |

*Sample: sample plus diluent.
**No dilution. True color equivalent of ASTM color.

The true color can be calculated by the method of dilution according to the formula:
True Color=True Color equivalent of ASTM Color of 4 to 5, times the dilution required to give an ASTM Color of 4 to 5 to the diluted product.

In the above table the true color values for 1:1 dilution corresponding to ASTM Colors for 4 to 5 are obtained from the chart on page 165 of "Industrial and Engineering Chemistry," February 1926.

The sulfurized products obtained in accordance with the herein described invention are soluble in hydrocarbon oils, such as for example, natural mineral lubricating oils and synthetic hydrocarbon lubricating oils, and when compounded with such oils are effective in imparting desirable properties thereto, such as for example, extreme pressure properties. The extreme properties imparted to such lubricating oils is shown by the data in the following table in which tests on the Almen machine are tabulated. These data were obtained on a blend of 90% of a mineral lubricating oil having an S. U. S. viscosity at 100° F. of from about 180 seconds, and 10% of the sulfurized lard oil above described.

| Oil | Almen Value | |
|---|---|---|
| | Pass | Fail |
| Control | 4 | 6 |
| Control+10% Product of Ex. I (supra) | 20 | 22 |
| Control+10% Product of Ex. II (supra) | 8 | 10 |

The sulfurization of unsaturated esters of aliphatic acids with a sulfur chloride in the presence of water and in the absence of added hydrogen sulfide is described and claimed in my copending application Serial No. 102,170, filed June 29, 1949. The sulfurization of substantially saturated oxygenated aliphatic compounds with a sulfur chloride in the presence of water and in the absence of added hydrogen sulfide is described and claimed in my copending application Serial No. 107,822, filed July 30, 1949.

While I have described in detail preferred embodiments of my invention it should be understood that the invention is not limited to any of the details herein above set forth but includes within its scope such modifications as come within the spirit of the appended claims.

I claim:
1. The method comprising reacting an unsaturated aliphatic compound having at least eight carbon atoms and at least one double bond selected from the group consisting of a fat, fatty acid and mixtures thereof, with a sulfur chloride in the presence of from about 5% to about 50% by volume of water at a temperature of from about 40° F. to about 250° F. in the absence of added hydrogen sulfide.

2. The method of claim 1 wherein the unsaturated compound is an unsaturated animal fat.

3. The method of claim 1 wherein the unsaturated compound is an unsaturated fatty acid of about 10 to 20 carbon atoms.

4. The method of claim 1 in which the unsaturated aliphatic compound contains a mixture of unsaturated fats and unsaturated fatty acids of about 10 to about 20 carbon atoms.

5. The method comprising reacting an unsaturated aliphatic compound having at least eight carbon atoms and at least one double bond selected from the group consisting of a fat, fatty acid and mixtures thereof, with a sulfur chloride in the presence of from about 5% to about 50% by volume of water at a temperature of from about 40° F. to about 250° F., in the absence of added hydrogen sulfide and neutralizing the sulfurized product.

6. The method of claim 5 in which the sulfurized product is neutralized with a basic alkali metal compound.

7. The method of claim 5 in which the sulfurized product is neutralized with an alkali metal carbonate.

8. The method of claim 5 in which the sulfurized product is neutralized with sodium carbonate.

9. The method of claim 5 in which the sulfurized product is treated with an alkali metal sulfide.

10. The method of claim 5 in which the sulfurized product is treated with sodium sulfide.

11. The method of sulfurizing an unsaturated aliphatic compound having at least eight carbon atoms and containing at least one double bond selected from the class consisting of an unsaturated fat, an unsaturated fatty acid and mixtures thereof, comprising reacting said unsaturated aliphatic compound with sulfur chloride in the presence of from about 5% to about 50% by volume of water at a temperature of from about 40° F. to about 250° F., in the absence of added hydrogen sulfide, neutralizing the sulfurized product with a basic reagent, refluxing the neutralized product with an alcoholic solution of an alkali metal sulfide, and recovering the neutralized sulfurized product.

12. The method of claim 11 in which the unsaturated aliphatic compound is an unsaturated fatty acid of about 10–20 carbon atoms.

13. The method of claim 11 in which the unsaturated aliphatic compound is oleic acid.

14. The method of claim 11 in which the unsaturated aliphatic compound is an animal fat.

15. The method of claim 11 in which the unsaturated aliphatic compound is a fish oil.

16. The method of sulfurizing an unsaturated aliphatic compound having at least eight carbon atoms and containing at least one double bond selected from the class consisting of an unsaturated fatty acid, unsaturated fat, and mixtures thereof, comprising reacting said unsaturated compound with sulfur chloride in the presence of from about 5% to about 50% by volume of water at a temperature of from about 40° F. to about 250° F., in the absence of added hydrogen sulfide, diluting the sulfurized product with a low boiling hydrocarbon solvent, neutralizing the diluted sulfurized product with an alkaline reagent, and deactivating the neutralized sulfurized product by refluxing the same with an alcoholic solution of an alkali metal sulfide.

17. The method of claim 16 in which the sulfurized product is diluted with hexane prior to being neutralized.

18. The method of sulfurizing an unsaturated aliphatic compound having at least eight carbon atoms and containing at least one double bond selected from the class consisting of an unsaturated fatty acid, unsaturated fat, and mixtures thereof, comprising diluting said unsaturated compound with an aliphatic hydrocarbon solvent, reacting the diluted mixture with a sulfur chloride in the presence of from about 5% to about 50% by volume of water at a temperature of from about 40° F. to about 250° F., in the absence of added hydrogen sulfide, neutralizing the sulfurized product with an alkaline reagent, deactivating the neutralized product by refluxing the same with an alkali metal sulfide, and recovering the deactivated sulfurized product.

HELEN SELLEI BERETVAS.

References Cited in the file of this patent

UNITED STATES PATENTS

| Number | Name | Date |
| --- | --- | --- |
| 2,218,997 | Wasson | Oct. 22, 1940 |
| 2,289,438 | Knowles et al. | July 14, 1942 |
| 2,337,473 | Knowles et al. | Dec. 21, 1943 |